United States Patent Office 3,160,651
Patented Dec. 8, 1964

3,160,651
THIOACETAMINO-DICARBOXYLIC ACID ESTERS OF PHOSPHORUS ACIDS
Hans-Gerd Schicke, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany
No Drawing. Filed July 6, 1961, Ser. No. 122,088
Claims priority, application Germany July 13, 1960
8 Claims. (Cl. 260—461)

The present invention relates to and has as its objects new and useful compounds with insecticidal activity based on phosphoric (phosphonic, phosphinic) or thio- or dithio-phosphoric (phosphonic, phosphinic) acid esters and processes for the production thereof.

When trichloro-thioacetamino-dicarboxylic acid halides are reacted with salts, preferably the alkali metal or ammonium salts, of phosphoric (phosphonic, phosphinic) or of thio- or dithiophosphoric (phosphonic, phosphinic) acids, the inventive compounds of the following general formula are obtained:

$$Cl_3C-\overset{S}{\overset{\|}{C}}-NH-\overset{O}{\overset{\|}{C}}-[CH_2]_n-\overset{O}{\overset{\|}{C}}-S-\overset{O(S)}{\overset{\|}{P}}\diagup\overset{R_1}{\diagdown R_2}$$
(O)

In this formula $R_1$ and $R_2$ denote any desired organic residues which may be linked directly or via oxygen to the phosphorus atom, whilst $n$ denotes a whole number from 0 to 4.

More particularly the radicals $R_1$ and $R_2$ mentioned above stand for lower alkoxy radicals, lower alkyl radicals with the carbon number up to 6; but furthermore they also may be radicals of aromatic nature such as phenyl radicals, hydroaromatic radicals, such as cyclohexyl radicals. At least one of the radicals $R_1$ or $R_2$ may be of unsaturated aliphatic nature.

The above described reaction is preferably carried out in inert solvents, such as, e.g., acetone or acetonitrile, and usually proceeds smoothly at room temperature or at a slightly elevated temperature.

The above mentioned trichloro-thioacetamino-dicarboxylic acid halides may be obtained by reacting corresponding dicarboxylic acid dihalides with trichloro-thio-acetamide.

Owing to their good insecticidal activity, the compounds obtainable according to the invention are intended to be employed as pest control agents, particularly in plant protection. They very effectively kill insects like flies, mites, aphids, etc. They distinguish themselves especially by a good contact-insecticidal activity and at the same time by an activity on eating insects such as caterpillars. They may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones as e.g. acetone or methyl ethyl ketone, liquid hydrocarbons and the like. The new compounds may furthermore be used in combination with each other or with known insecticides, fertilizers etc.

As an example for the special utility of the inventive compounds the ester of the following formula $$Cl_3-\overset{S}{\overset{\|}{C}}-\overset{O}{\overset{\|}{C}}-NH-\overset{O}{\overset{\|}{C}}-\overset{O}{\overset{\|}{C}}-S-\overset{S}{\overset{\|}{P}}\diagup\overset{CH_3}{\diagdown CH_3}$$

has been tested against spider mites and aphids. Aqueous solutions of the above mentioned compound have been prepared by admixing them with the same amount of an auxiliary solvent (acetone). A commercial emulsifier (benzyl hydroxy diphenyl polyglycol ether) is added in an amount of 20% referred to active ingredient. The premixture then is diluted with water to the desired concentration. The tests have been carried out as follows:

(a) Against spider mites (contact-insecticidal action): Bean plants (*Phaseolus vulgaris*) of about 15 inches height were sprayed drip wet with solutions as prepared above in a concentration as shown below. The bean plants have been infested heavily with the two-spotted spider (species *Tetranychus telarius*). Evaluation has been carried out after 24 hours, 48 hours and 8 days. The spider mites are killed completely with 0.1% solutions.

(b) Against aphids (species *Doralis fabae*): Heavily infested bean plants (*Vitia faba*) have been sprayed drip wet with solutions as prepared above in a concentration as shown below. The effect has been determined by evaluation after 24 hours by counting the dead pests either on the surface of the soil or still remaining on the plants. Aphids were killed completely with 0.1% solutions.

The process is explained with the aid of the following examples.

Example 1

$$Cl_3C-\overset{S}{\overset{\|}{C}}-NH-\overset{O}{\overset{\|}{C}}-\overset{O}{\overset{\|}{C}}-Cl$$

To a solution of 38 grams (0.3 mol) of oxalylchloride in 70 cc. of methyl ethyl ketone there is added dropwise at 50–60° C. a solution of 53.5 grams (0.3 mol) of trichlorothioacetamide in 200 cc. of methyl ethyl ketone. When evolution of the hydrochloric acid is finished the solvent is distilled off in vacuum, the residue is stirred with petrol ether and thereafter filtered off with suction. There are obtained colorless crystals, which are already pure for further working up. Yield 64 grams corresponding to 79% of the theoretical.

After recrystallization from benzene the product melts at 128–130° C. under decomposition.

*Analysis.*—Calculated for mol 269: Cl, 52.8%; S, 11.9%; N, 5.2%. Found: Cl, 52.19%; S, 12.24%; N, 5.24%.

By the same way there may be obtained the following compounds:

$$Cl_3C-\overset{S}{\overset{\|}{C}}-NH-\overset{O}{\overset{\|}{C}}-CH_2-CH_2-\overset{O}{\overset{\|}{C}}-Cl$$

$$Cl_3C-\overset{S}{\overset{\|}{C}}-NH-\overset{O}{\overset{\|}{C}}-CH_2-\overset{O}{\overset{\|}{C}}-Cl$$

Example 2

$$Cl_3C-\overset{S}{\overset{\|}{C}}-NH-\overset{O}{\overset{\|}{C}}-\overset{O}{\overset{\|}{C}}-S-\overset{S}{\overset{\|}{P}}\diagup\overset{OC_2H_5}{\diagdown OC_2H_5}$$

27 grams (0.1 mol) of trichlorothioacetamido-oxalylchloride are dissolved in 150 cc. of acetonitrile, and a solution of 21 grams of ammonium diethyldithiophosphate in 100 cc. of acetonitrile is added dropwise at room temperature to the resulting solution, with stirring. After stirring at about 20° C. for 1 hour the reaction mixture is poured into water, the precipitated colorless crystals are filtered off with suction, dried in the air, and finally recrystallized from a ligroin/benzene mixture. Yield: 37 grams=88% of the theoretical, M.P. 124–125° C. (with decomposition).

*Analysis.*—Calculated for mol 418.5: P, 7.4%; S, 23.0%; N, 3.36%. Found: P, 7.2%; S, 22.54%; N, 3.59%.

Aphids and spider mites are killed completely with 0.1% solutions. Systemic action with 0.1% solutions=100%.

By the same way there may be obtained the compound of the following formula:

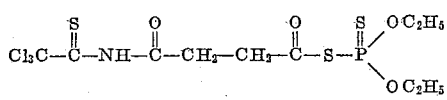

Also the following compounds may be prepared by an analogous method.

M.P. 140° C. (decomposition) yield 70% of theory:

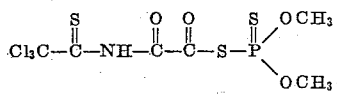

M.P. 125–126° C. (decomposition) yield 77% of theory:

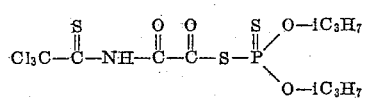

*Example 3*

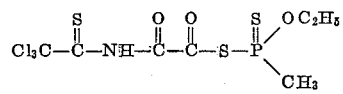

40 grams (0.15 mol) of trichlorothioacetamido-oxalyl-chloride are dissolved in 200 cc. of acetonitrile. Thereafter, a solution of 29 grams (0.15 mol) of the potassium salt of methyl-thionophosphonic-O-ethyl ester-thiol-acid in 100 cc. of acetonitrile is introduced dropwise at 20–25° C., with stirring, the mixture is stirred for 1 hour more, and the reaction mixture then poured into water, the separated oil is taken up in methylene chloride, the solvent is distilled off in vacuum, and the crystalline residue is recrystallized from benzene-ligroin, a little petroleum ether being added to complete crystallization.

Yield: 47 grams=80% of the theoretical, M.P. 116° C. (with decomposition).

*Analysis.*—Calculated for mol 388.5: N, 3.61%; S, 24.75%; P, 7.98%; Cl, 27.42%. Found: N, 3.83%; S, 23.92%; P, 7.26%; Cl, 27.71%.

Spider mites are killed completely with 0.1% solutions. The compound shows an ovicidal action on the eggs of the red spider. Systemic action with 0.1% solutions=100%.

By the same way there may be obtained the compounds of the following formulae:

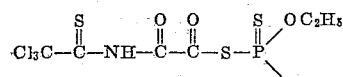

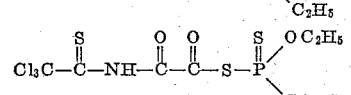

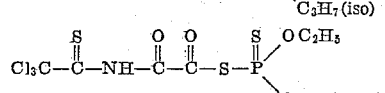

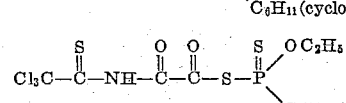

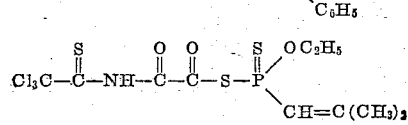

*Example 4*

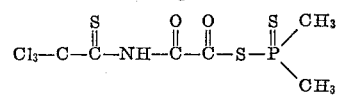

40 grams (0.15 mol) of trichlorothioacetamido-oxalylchloride are dissolved in 200 cc. of acetonitrile. 25 grams (0.15 mol) of potassium dimethyl-thionothiol-phosphinate, in solution in 150 cc. of acetonitrile, are introduced dropwise at 20–25° C. into this solution, with stirring, the mixture stirred for about 15 minutes longer, the reaction product poured into water, filtered off with suction and dried in the air. After recrystallization from benzene (with addition of a little acetone), there are obtained colorless crystals of M.P. 130–132° C. (with decomposition).

Yield: 38 grams=72% of the theoretical.

Aphids and spider mites are killed completely with 0.1% solutions.

By the same way there may be obtained the compounds of the following formulae:

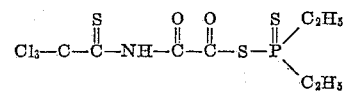

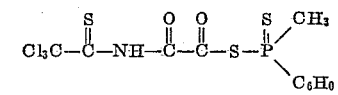

*Example 5*

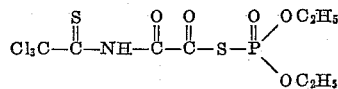

28 grams (0.15 mol) of ammonium diethylthiolphosphoric acid chloride are added dropwise at 20–25° C., with stirring, to a solution of 40 grams (0.15 mol) of (chloroxalyl)-trichlorothioacetamide in 200 cc. of acetonitrile, and the acetonitrile is largely evaporated in vacuum at the lowest possible temperature. The residue is treated with water, and the precipitated crystals are filtered off with suction and dried.

After recrystallization from acetonitrile, there are obtained colorless crystals which melt at 120–121° C. with decomposition.

Yield: 33 grams=55% of the theoretical.

*Analysis.*—Calculated for mol 402.5: P, 7.7%; S, 15.92%; Cl, 26.50%; N, 3.458%. Found: P, 7.54%; S, 15.56%; Cl, 26.85%; N, 3.94%.

Aphids are killed completely with 0.1% solutions. Systemic action with 0.1% solutions=100%.

By the same way there may be obtained the compound of the following formula:

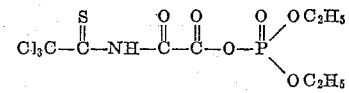

We claim:

1. A compound of the formula

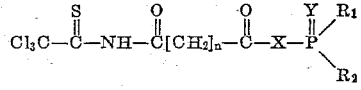

wherein $R_1$ and $R_2$ each stand for a member selected from the group consisting of alkyl having up to six carbon atoms, alkenyl having up to 6 carbon atoms, cyclohexyl, phenyl and alkoxy having up to 6 carbon atoms; $n$ stands for a whole number from 0 to 4, and X and Y each stand for a chalcogen having an atomic number from 8 to 16.

2. A compound of claim 1 wherein $R_1$ and $R_2$ are each lower alkoxy having up to 6 carbon atoms.

3. A compound of claim 1 wherein $R_1$ and $R_2$ are each lower alkyl having up to 6 carbon atoms.

4. A compound of claim 1 wherein $R_1$ is lower alkyl having up to 6 carbon atoms and $R_2$ is lower alkoxy having up to 6 carbon atoms.

5. The compound of the following formula

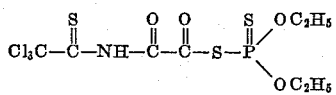

6. The compound of the following formula

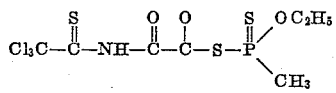

7. The compound of the following formula

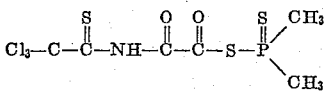

8. The compound of the following formula

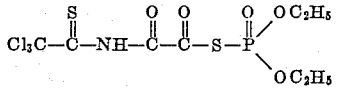

References Cited in the file of this patent
UNITED STATES PATENTS

| | | |
|---|---|---|
| 2,411,875 | Gresham et al. | Dec. 3, 1946 |
| 2,648,696 | Whetstone | Aug. 11, 1953 |
| 2,816,141 | Ellingboe et al. | Dec. 10, 1957 |
| 2,939,876 | Cramer et al. | June 7, 1960 |